D. ROBERTSON.
PACKING DEVICE FOR PISTON RODS, SLIDE VALVE RODS, &c.
APPLICATION FILED JULY 21, 1910.
1,008,067.
Patented Nov. 7, 1911.
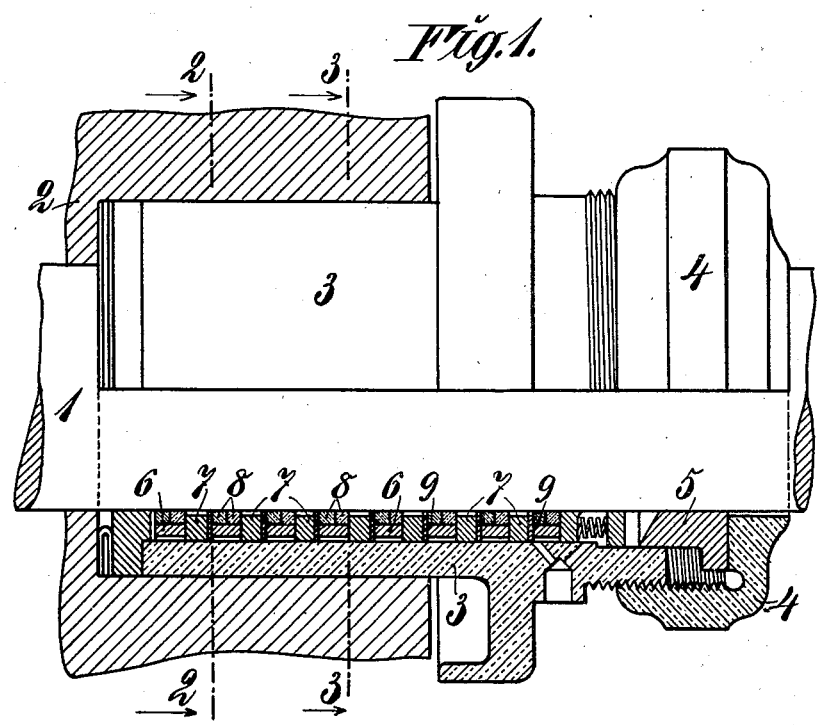
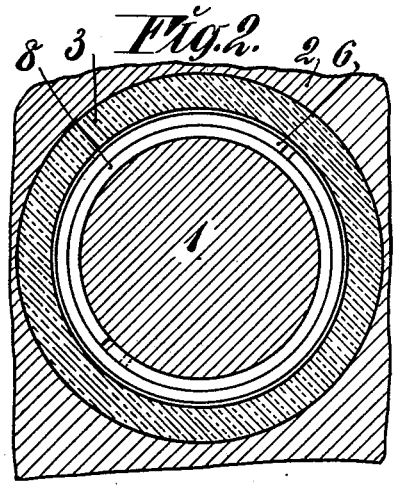 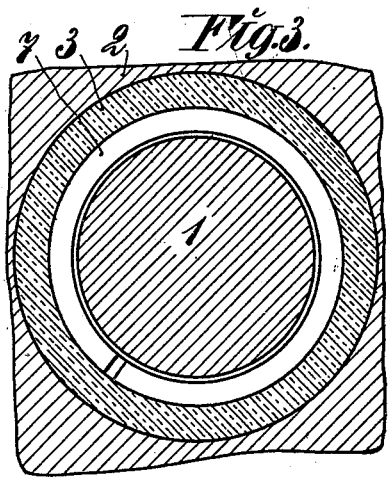
Witnesses:-
Inventor:-

UNITED STATES PATENT OFFICE.

DAVY ROBERTSON, OF GOTTENBORG, SWEDEN.

PACKING DEVICE FOR PISTON-RODS, SLIDE-VALVE RODS, &c.

1,008,067.  Specification of Letters Patent.  Patented Nov. 7, 1911.

Application filed July 21, 1910. Serial No. 573,053.

*To all whom it may concern:*

Be it known that I, DAVY ROBERTSON, a subject of the King of Sweden, and residing at Stampgatan 30, Gottenborg, in the Kingdom of Sweden, have invented certain new and useful Improvements in Packing Devices for Piston-Rods, Slide-Valve Rods, Plungers, and the Like, of which the following is a specification, reference being had therein to the accompanying drawing.

This invention relates to packing devices for piston rods and the like, chiefly based upon the applying of packing rings of the class before known, which by subjecting the same to a hammering or rolling operation at their inner or outer side have been rendered rigid in one part and decreasing in rigidity in both directions from the said part, and then have been cut up at a point located opposite the said part, so that the ends will expand outward or be forced inward and press against the coöperating surface uniformly. As before known, uncut rings have been used as packing means in stuff-boxes, which rings fit to the shaft and the wall of the said box alternately, without being forced against the same. According to this invention a reliable packing device around piston rods and the like may be provided by mounting on the rod elastic rings of the class stated above in such manner, that for instance every other ring acts outward and bears against the inner side of the stuff-box, while the other rings act inward and bear against the piston rod or against one or more ring-shaped liners provided between the piston rod and the ring. Between the rings thus mounted other inelastic rings or interposed disks of iron or other metal may be provided, if necessary, the whole being then compressed by means of the cover of the stuff-box or by any other means.

In the accompanying drawing a packing device arranged in accordance with this invention is shown applied to a piston rod.

Figure 1 is a longitudinal section and partly a side elevation of the stuff-box. Figs. 2 and 3 are sections on the line 2 to 2 and 3 to 3 respectively of Fig. 1.

1 is the piston rod, 2 the cover of the cylinder and 3 the stuff-box, provided with the screw-threaded cover 4 and a ring 5, which is located between the cover last mentioned and the packing means and extends into the box.

6 are the packing rings. The cross sectional area of the said rings is uniform at all points and the rings have been treated in the manner stated above, so that their ends are forced uniformly inward by the tension. 7 are other packing rings, the cross sectional area of which also is uniform at all points and which, owing to a similar treatment, tend to expand. According to the drawing every other ring (6) acts inward, while the other rings (7) act outward. Ring shaped liners 8 of any suitable material are provided between the rings 6 and the piston rod. In order to provide packing means between the rings 6 with the corresponding liners 8 and the rings 7, rings or interposed pieces 9 of iron or any other metal are provided between the same. As the rings have been mounted in the box, the cover 4 is screwed inward, the rings being thus forced against each other. It appears from the drawing, that the rings 6 together with the liners 8 bear tightly against the piston rod, thus preventing steam from escaping between the piston rod and the said rings. The rings 7 on the other hand bear tightly against the inner side of the stuff-box, and the rings 9 finally close the spaces between the rings 6 with their rings 8 and the rings 7. Owing to the said arrangements a fully reliable packing device is attained. The sides of the rings 6 and 7 may have been made so plain, that they fit sufficiently closely to each other without the use of any packing rings such as 9. The succession in which the rings 6 and 7 are mounted may, evidently, be varied.

Having now described my invention, what I claim as new and desire to secure by Letters Patent is:

1. In a packing device for piston rods, slide valve rods, plungers and the like, the combination of the stuffing-box, a ring having its outer side rendered rigid at one part and decreasing in rigidity in both directions therefrom and divided at a point located opposite the said part and a ring having its inner side rendered rigid at one part and decreasing in rigidity in both directions from the part and divided at a point located opposite said rigid part, the said rings being located on the rod and pressing, the one against the outer surface of the rod and the other against the inner surface of the stuffing-box, substantially as described and for the purpose set forth.

2. In a packing device for piston rods, slide valve rods, plungers and the like, the combination of the stuffing-box, rings having their outer sides at a certain part rendered rigid by a hammering or rolling operation and decreasing in rigidity in both directions from said part and divided at a point opposite said rigid part, rings having their inner sides at a certain part rendered rigid by hammering or rolling and decreasing in rigidity in both directions from said part and divided at a point opposite said part, said rings being located on the rod alternately with the first named rings, and interposed rings located on the rod between the aforesaid rings, substantially as described and for the purpose set forth.

3. In a packing device for piston rods, slide valve rods, plungers and the like, the combination of the stuffing-box, rings having their outer faces at a certain part rendered rigid and decreasing in rigidity in both directions from said part and divided at a point opposite said part, rings having their inner surfaces rendered rigid at a certain part and decreasing in rigidity in both directions from said part, and divided at a point opposite said part, the last named rings being arranged on the rod alternately with the first named rings whereby the one ring will press against the interior of the box and the adjacent ring press toward the rod, interposed rings located between the aforesaid rings and ring-shaped liners located on the rod between the rod and the rings which press toward the rod.

In testimony whereof I have affixed my signature in presence of two witnesses.

DAVY ROBERTSON.

Witnesses:
HERMAN VICOMA,
HUGO WIKSTROM.

---

Copies of this patent may be obtained for five cents each, by addressing the " Commissioner of Patents, Washington, D. C."